United States Patent
Quadranti et al.

(10) Patent No.: US 6,594,391 B1
(45) Date of Patent: Jul. 15, 2003

(54) METHOD AND APPARATUS FOR TEXTURE ANALYSIS AND REPLICABILITY DETERMINATION

(75) Inventors: Laurent Lorenzo Balmelli Quadranti, St-Blaise (CH); Aleksandra Mojsilovic, Basking Ridge, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/390,388

(22) Filed: Sep. 3, 1999

(51) Int. Cl.[7] .............................. G06K 9/46; G06K 9/40; G06K 9/36; H04N 7/12

(52) U.S. Cl. ........................ 382/203; 382/240; 382/260; 375/240.19

(58) Field of Search ................................. 382/190, 195, 382/203, 224, 225, 232, 260, 263, 264, 279, 296, 240, 108; 375/240.18, 240.19, 240.08

(56) References Cited

U.S. PATENT DOCUMENTS 5,561,724 A * 10/1996 Kido et al. ................. 382/264
6,222,941 B1 * 4/2001 Zandi et al. ................ 382/232

OTHER PUBLICATIONS

S.G. Mallat, "A Theory for Multiresolution Signal Decomposition: the Wavelet Representation", Jul. 1989; IEEE Transaction on PAMI, ISSN: 0162–8828, vol. II, No. 7, pp. 674–693.*

Rao et al, "Towards a Texture Naming System: Identifying Relevant Dimensions of Texture", Oct. 1993; IEEE Conference on Visualization, ISBN: 0–8186–3940–7, pp. 220–227.*

D. Schweitzer, "Artificial Texturing: An Aid to Surface Visualization", Jul. 1983; Computer Graphics, ISBN: 0–89791–109–1, vol. 17, No. 3, pp. 23–29.*

L. Taycher, "Image Feature Extraction Subsystem of the ImageRover W W W Image Search System", Aug. 1997; Master Project at Boston University, pp. 1–22.*

W. A. Barrett, "A Survey of Face Recognition Algorithms and Testing Results", Nov. 1997; IEEE Conference on SSC, ISBN: 0–8186–8316–3, vol. 1, pp. 301–305.*

H. Tamura et al., "Textural Features Correspondng to Visual Perception," IEEE Transactions on Systems, Man and Cybernetics, vol. SMC–8, No. 6, pp. 460–473, Jun. 1978.

T.V. Papathomas, "A Human Vision Based Computational Model for Chromatic Texture Segregation," IEEE Transactions on Systems, Man, and Cybernetics–Part B: vol. 27., No. 3, pp. 428–439, Jun. 1997.

W.Y. Ma et al., "Tools for Texture/Color Based Search of Images," SPIE, vol. 3016, pp. 496–505, 1997.

R. Manmatha et al., "A Syntactic Characterization of Appearance and its Application to Image Retrieval," SPIE, vol. 3016, pp. 484–495, 1997.

T. Frese et al., "A Methodology for Designing Image Similarity Metrics Based on Human Visual System Models," In. Proc. of SPIE, vol. 3016, pp. 472–479, 1997.

A.R. Rao et al., "Towards a Texture Naming system: Identifying Relevant Dimensions of Texture," Vision Res., vol. 36, No. 11, pp. 1650–1663, 1996.

* cited by examiner

*Primary Examiner*—Mehrdad Dastouri
(74) *Attorney, Agent, or Firm*—Ryan, Mason & Lewis, LLP (57) ABSTRACT

An image or other information signal having a texture is analyzed along perceptual dimensions such as directionality, symmetry, regularity and type of regularity. A wavelet decomposition or other type of filtering operation is first applied to the information signal, in order to generate oriented subbands. Texture-related features, e.g., coarse features, vertical edges, horizontal edges, corners, etc., are then extracted from the subbands. The extracted features are then used to characterize the above-noted perceptual dimensions of the texture. A classification process may subsequently be used to classify the texture as directional, symmetric, regular and/or having a particular regularity type, e.g., a small, medium or large regularity, based on comparison with established thresholds. Advantageously, the classification process can also be used to determine the replicability of the texture.

22 Claims, 8 Drawing Sheets

METHOD AND APPARATUS FOR TEXTURE ANALYSIS AND REPLICABILITY DETERMINATION

FIELD OF THE INVENTION

The present invention relates generally to techniques for processing images, video and other types of information signals, and more particularly to systems and devices for analyzing and otherwise processing information signals which can be characterized as including textures.

BACKGROUND OF THE INVENTION

Flexible manipulation of image textures has become increasingly important in image processing applications such as computer graphics, video editing, photo-journalism, art, fashion, cataloging, retailing, interactive computer-aided design (CAD), geographic data processing, etc. For example, image texture mapping has become an essential part of computer graphics applications in that it greatly improves the rendering quality of a three-dimensional (3D) environment. The texture mapping approach in such applications is often a simple mapping based on texture replication, which is particularly well-suited for real-time processing.

Conventional image texture analysis and processing techniques for use in such applications are described in, e.g., H. Tamura et al., "Textural features corresponding to visual perception," IEEE Transactions on Systems, Man and Cybernetics, Vol. 8, pp. 460–473, 1982. The Tamura feature set and other conventional texture processing systems generally concentrate on gray-level natural textures. Another example of such an approach, as described in A. R. Rao and G. L. Lohse, "Towards a texture naming system: Identifying relevant dimensions of texture," Vision Res., Vol. 36, No. 11, pp. 1649–1669, 1996, focuses on how people classify textures in meaningful, hierarchically-structured categories, identifying relevant features used in the perception of gray-level textures. These and other studies of textual perception have thus focused primarily on developing reliable models for texture discrimination, as well as on the detection of perceptual categories to whose variations humans are the most sensitive.

An important issue which arises in many texture processing applications relates to the replicability of the texture. Replicability is clearly a major concern in the above-noted 3D computer graphics texture mapping. As another example, consider an application in which an image in the form of a "swatch" or other type of sample is stored in an electronic database of wallpaper or upholstery patterns. Although it is typical for the sample to represent a small sub-unit of a larger-scale pattern, the sample itself may be too small to contain enough information to regenerate the larger-scale pattern. This poses a problem if, e.g., there is a desire to generate a display representing the overall appearance of a room or other large surface when wallpapered, upholstered, etc. with a selected pattern. It is generally necessary to replicate the sample provided in order to cover the desired surface. However, misleading and even unpleasant distortions may result if the provided sample is in fact not replicable. Similar concerns are present in other applications involving texture replication. Nonetheless, certain corrections can often be made to a non-replicable texture, in order to improve the appearance of the surface over which it has been replicated. It is therefore important to be able to determine whether a particular image texture sample is replicable.

Wavelet transforms have been widely used for description of image textures. Although numerous decomposition schemes have been proposed for the purpose of texture characterization, numerical description is mainly achieved through second or higher order statistics of the wavelet coefficients. Unfortunately, existing wavelet transforms generally do not measure texture quality along the most important perceptual dimensions. In other words, existing wavelet transform techniques as applied to images fail to quantify textures in the way humans typically see them, i.e., as coarse, regular, directional, symmetric, etc.

As is apparent from the above,, a need exists for improved techniques for analyzing, classifying and otherwise processing image textures, and for accurately and efficiently determining the replicability of such textures.

SUMMARY OF THE INVENTION

The invention provides improved techniques for analysis of textures, which involve characterizing the textures along perceptual dimensions such as directionality, symmetry, regularity and type of regularity. In an illustrative embodiment, a wavelet decomposition or other type of filtering operation is first applied to an image or other information signal including a texture, in order to generate oriented subbands. Texture-related features e.g., coarse features, vertical edges, horizontal edges, corners, etc. are extracted from the subbands. The extracted features are then used to characterize the above-noted perceptual dimensions of the texture. A classification process may subsequently be used to classify the texture as directional, symmetric, regular and/or having a particular regularity type, e.g., a small, medium or large regularity, based on comparison of the determined dimensions for the texture with established thresholds. Advantageously, the classification process can also be used to determine the replicability of the texture.

The techniques of the present invention may be implemented in one or more software programs running on a personal computer, server, workstation, microcomputer, mainframe computer or any other type of programmable digital processor. The invention substantially improves the analysis, replicability determination and other processing of information relating to texture. In addition, the invention can be configured to provide real-time processing of texture information. These and other features and advantages of the present invention will become more apparent from the accompanying drawings and the following detailed description.

DETAILED DESCRIPTION OF THE INVENTION

The present invention will be illustrated below in conjunction with exemplary texture processing techniques implemented in computer-based processing systems. It should be understood, however, that the invention is not limited to use with any particular type of information processing system. The disclosed techniques are suitable for use with a wide variety of other systems and in numerous alternative applications. The term "information signal" as used herein is intended to include an image, a sequence of video frames, or any other type of signal that may be characterized as having a texture. The term "texture" as used herein refers generally to: visually-perceptible characteristics, such as, e.g., directionality, symmetry, regularity, of an image or other information signal.

Figure 1:
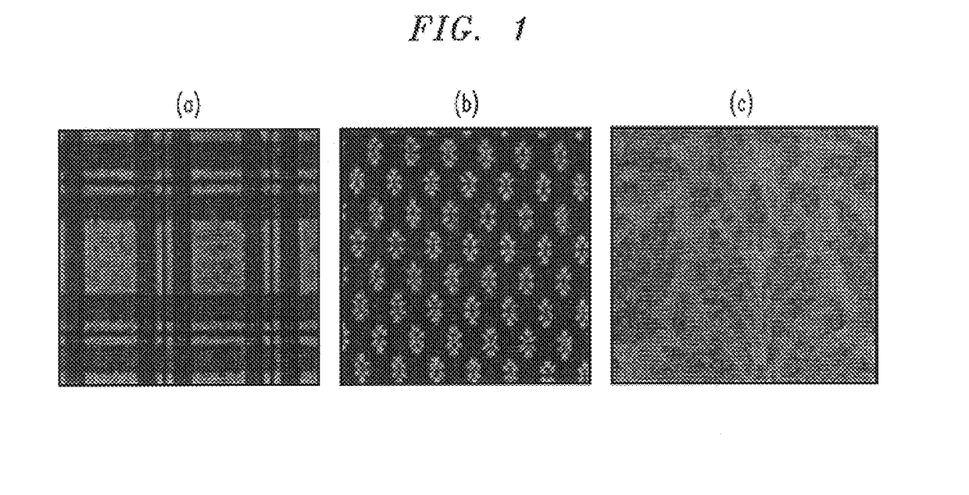
FIGS. 1(a), 1(b) and 1(c) show exemplary image textures with different features.

The present invention provides wavelet domain signal processing techniques for texture analysis, e.g., texture classification and other types of processing, and for determining texture replicability. An important aspect of the invention is that it classifies textures along perceptual dimensions such as directionality, symmetry, regularity and type of regularity. FIGS. 1(a), 1(b) and 1(c) show examples of a directional texture, a regular texture, and a vertically symmetric texture, respectively. Advantageously, the texture analysis techniques of the invention can also be used to determine the replicability of a particular texture.

Figure 2:
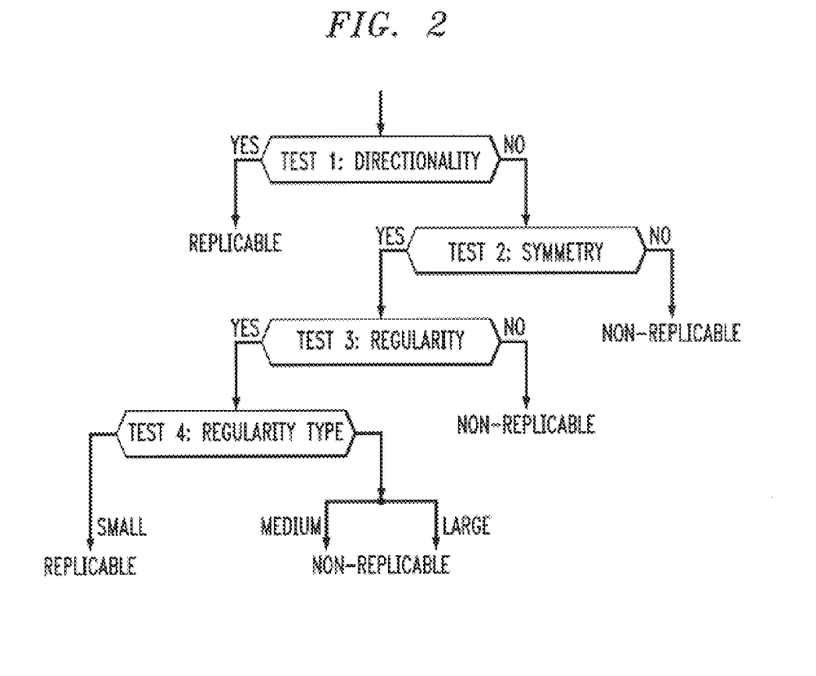
FIG. 2 is a classification tree illustrating the manner in which different textures can be classified in accordance with the invention.

FIG. 2 shows a texture classification tree in accordance with the invention. The classification tree can be used in a texture analysis process to classify a texture in accordance with the above-noted perceptual dimensions, and can also be used to determine if the texture is replicable. The classification tree includes four tests as shown. Test 1 determines the directionality of the texture. If the texture is determined in Test 1 to have a designated directionality, it is replicable. If not, Test 2 is applied to determine the symmetry of the texture. If Test 2 indicates that the texture does not have a designated symmetry, the texture is not replicable. If it is symmetric, Test 3 is applied to determine the regularity of the texture. If Test 3 indicates that the texture does not have a designated regularity, the texture is not replicable. If the texture is regular, Test 4 is applied to determine the regularity type of the texture. If the texture regularity type is small, the texture is replicable. If the texture regularity type is medium or large, the texture is not replicable.

The texture analysis and replicability determination techniques of the invention in an illustrative embodiment include the processes of wavelet decomposition, followed by feature extraction and texture classification. Each of these processes will be described in greater detail below.

Wavelet Decomposition

In accordance with the invention, a wavelet decomposition is applied to an image in order to generate oriented subbands, such that features can then be extracted from the subbands. The wavelet decomposition may be implemented utilizing wavelet processing techniques such as those described in, e.g., S. Mallat, "A Wavelet Tour of Signal Processing," Academic Press, 1998. Advantageously, use of the wavelet transform to implement an image decomposition allows the subsequent feature extraction and replicability determination processes to proceed substantially in real time. It should be noted, however, that the invention is not limited to real-time processing, and other embodiments could, e.g., precompute and store texture analysis information for later use. The particular type of processing used in a given embodiment will of course depend on the requirements of the application. It should also be noted that the use of the wavelet transform is not a requirement of the invention, and numerous other types of filtering could be used to implement texture analysis based on the perceptual dimensions of directionality, symmetry, regularity and regularity type in accordance with the invention.

Figure 3:
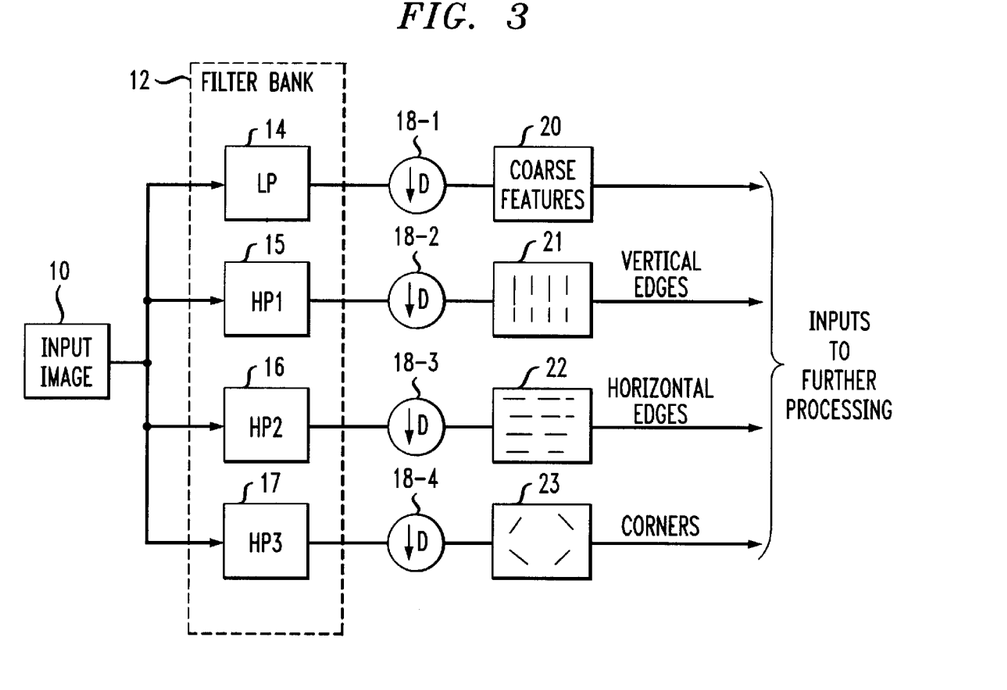
FIG. 3 shows an exemplary filter bank for implementing a one-level wavelet decomposition in accordance with the invention.
Figure 4:
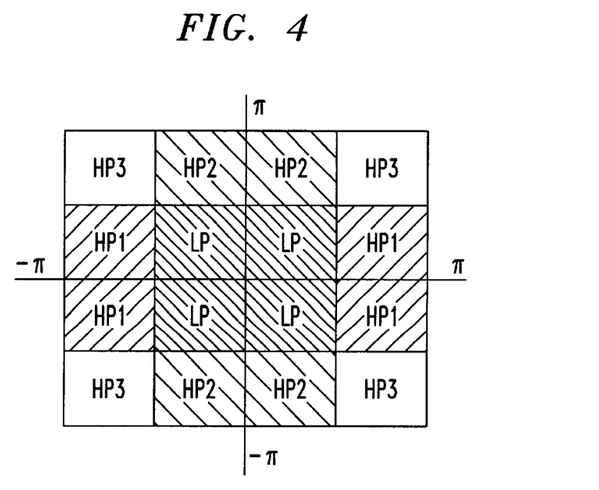
FIG. 4 is a graphical representation of a frequency domain partitioning by filters in the filter bank of FIG. 3.

An exemplary wavelet image decomposition in accordance with the invention is illustrated in conjunction with FIGS. 3 and 4. FIG. 3 is a block diagram illustrating the wavelet decomposition process. An input image 10 is applied to a wavelet transform filter bank 12. The filter bank 12 includes a lowpass (LP) filter 14, and first, second and third highpass (HP) filters 15, 16 and 17, respectively. The outputs of each of the filters 14, 15, 16 and 17 are decimated by a factor of D in downsamplers 18-1, 18-2, 18-3 and 18-4, respectively. The downsampled output of the LP filter 14 is a first subband from which coarse features 20 of the input image 10 are extracted. Similarly, the downsampled outputs of the HP1, HP2, and HP3 filters 15, 16 and 17 represent oriented subbands from which vertical edges 21, horizontal edges 22, and corners 23, respectively, of the input image 10 are extracted. These extracted features are supplied as inputs to subsequent processing operations, such as a replicability determination process. Other processing operations could also be performed. For example, the output of the LP filter 14 could be subjected to additional filtering operations at a lower level of spatial resolution.

FIG. 4 illustrates the frequency domain partitioning implemented by the filters 14, 15, 16 and 17 in the filter bank of FIG. 3. In this implementation, the value of the downsampling factor D is 2, and the corresponding wavelet transform is referred to as a one-level transform. It should be noted that the exemplary wavelet decomposition arrangement shown in FIGS. 3 and 4 is for purposes of illustration only, and numerous other arrangements of filters, downsamplers and other elements may be used in other embodiments. One such alternative arrangement, corresponding to a two-level wavelet transform with a down sampling factor of D=4, is described below in conjunction with FIGS. 5 and 6.

A more detailed example of an illustrative wavelet image decomposition process in accordance with the invention will now be described. An original discrete image texture $T_0[n, m]$ characterizes uniquely an original space $V_0$, while a set of approximation spaces $\{V_j\}_{j \in z}$ is computed such that $V_{j-1} = V_j \oplus W_j$, where $W_j$ is the detail space. In the case of the wavelet packet bases each projection space is denoted as $W_j^{p,q}$, where j represents resolution and p, q are subband indices. Then, each space $W_j^{p,q}$ is a sum of four subspaces $$W_j^{p,q} = W_{j+1}^{2p,2q} \otimes W_{j+1}^{2p+1,2q} \otimes W_{j+1}^{2p,2q+1} \otimes W_{j+1}^{2p+1,2q+1}. \quad (1)$$

Essentially, these subspaces can be viewed as outputs of filters used to generate oriented subbands from which detail coefficients and image edges can be extracted along different orientations. Before the decomposition, each texture $T=(t_{i,j})$ is normalized to zero mean and unit variance, i.e., each pixel of the corresponding image is transformed such that $$\tilde{t}_{i,j} = \frac{t_{i,j} - E(T)}{\sigma(T)}, \quad (2)$$

where $E(\cdot)$ and $\sigma(\cdot)$ are the mean and standard deviation of the texture.

Figure 5:
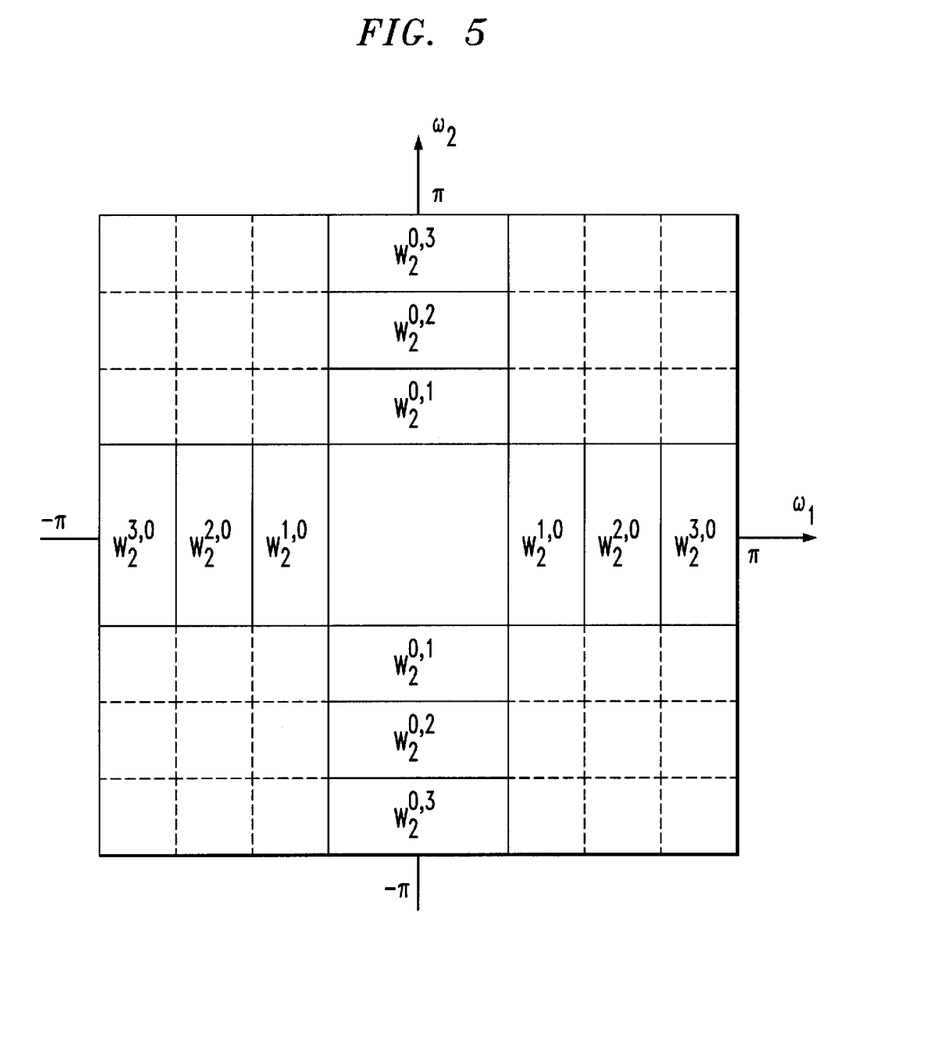
FIG. 5 shows an exemplary frequency domain partitioning after a two-level wavelet decomposition in accordance with the invention.
Figure 6:
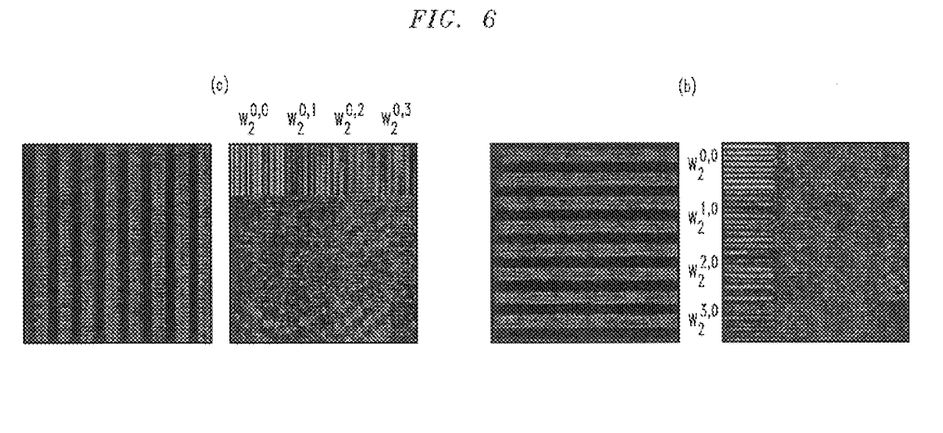
FIGS. 6(a) and 6(b) show the two-level wavelet decomposition of a vertical stripe texture and a horizontal stripe texture, respectively, in accordance with the invention.

In the above-noted two-level wavelet transform example, with D=4, the wavelet decomposition is performed in two levels leading to 16 subbands. Such an arrangement may be implemented utilizing well-known quadratic spline filters, where the lowpass filter is given by, e.g., $h_0=[¼\ ¾\ ¾\ ¼]$ and the highpass filter is given by,,e.g., $h1=[-¼\ -¾\ ¾\ ¼]$. After the decomposition, image denoising is performed in each subband, by thresholding the wavelet coefficients. Hard thresholds are applied, with the threshold values estimated from the uniform background of several images from an image database. The feature extraction is performed in subbands $W_2^{0,j}$, with j=1, . . . , 3 (representing the vertical high frequencies, i.e., horizontal edges) and $W_2^{i,0}$, with i=1, . . . , 3 (representing the horizontal high frequencies, i.e., vertical edges). Other subbands were not used in this example since there is a significant amount of correlation among the subbands. Moreover, sensitivity of the human visual system is the highest along the horizontal and vertical directions. FIG. 5 shows a frequency domain partitioning in accordance with the above-described two-level wavelet decomposition, i.e., illustrates the locations of the resulting subbands in the frequency plane.

FIGS. 6(a) and 6(b) each show the two-level wavelet decomposition as applied to a representative image, where indicated subbands are used for feature extraction. More particularly, FIG. 6(a) shows the subbands $W_2^{0,j}$, j=1, . . . , 3, used to extract horizontal edges from an image having a texture comprising vertical stripes, and FIG. 6(b) shows the subbands $W_2^{i,0}$, i=1, . . . , 3, used to extract vertical edges from an image having a texture comprising horizontal stripes.

Feature Extraction

Starting from the previously explained wavelet decomposition, feature extraction is performed in the selected subbands. The objective of the feature extraction, is to compute the following feature vector $$f_T = [d_x\ d_y\ s_x\ s_y\ r_{x,m}\ r_{x,s}\ r_{x,f}\ r_{y,m}\ r_{y,s}\ r_{y,f}]. \quad (3)$$

where $d_x$ and $d_y$ represent measures of horizontal and vertical directionality, $r_{x,m}, r_{x,s}$ and $r_{x,f}$ are regularity features along the horizontal axis, $r_{y,m}$, and $r_{y,f}$ are regularity features along the vertical axis, and $s_x$ and $s_y$ are measures of symmetry along horizontal and vertical axes. Both directionality and regularity are evaluated by measuring the variation of edges along the horizontal and vertical axes, as will be explained in detail below.

Figure 7:
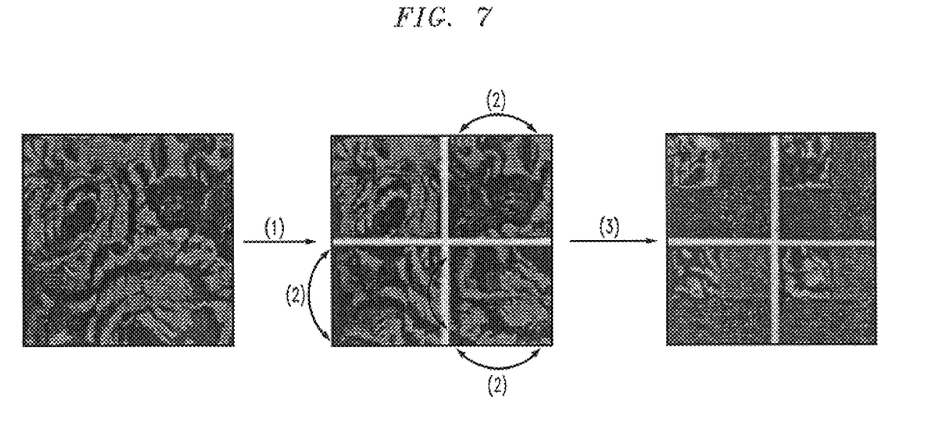
FIG. 7 illustrates image processing operations for the detection of symmetry using the technique of the invention.

In order to detect symmetry along horizontal and vertical axes, the analyzed texture may be split into four regions before the wavelet decomposition, as depicted in step (1) of FIG. 7. Each region of the texture is provided with the same orientation by flipping the regions as shown in step (2). Finally, the resulting regions in step (3) are decomposed into lowpass and highpass components. Note that the analysis of symmetry is performed via the one-level decomposition. Then, the symmetry is measured by comparing the corresponding lowpass and highpass channels, as will be explained in detail below.

Directionality

To estimate directionality, a correlation sequence $c_k$ is constructed,,expressing the variation of texture edges along the horizontal or vertical axis. The directionality function along the horizontal or x axis is based on the correlation between the wavelet coefficients of the successive columns in the horizontal subbands. Similarly, the directionality function along the vertical or y axis is based on the correlation between the wavelet coefficients of the successive rows in the vertical subbands. To obtain an analysis independent of texture intensity, a normalized correlation function is used. Hence, the normalized correlation c(i, j) between the rows or columns of the detail coefficients is given by $$c(i, j) = \frac{E(d_i d_j) - E(d_i) E(d_j)}{\sigma(d_i) \sigma(d_j)}, \quad (4)$$

where $d_i$ and $d_j$ are sequences of the wavelet coefficients within the rows or columns i and j, respectively, $E(\cdot)$ is the expected value and $\sigma(\cdot)$ is the standard deviation. Moreover, since the goal in this embodiment is to measure similarity between the corresponding coefficients of $d_i$ and $d_j$, one need only compute the so-called "lag-0" correlation, i.e., the correlation between coefficient 0 of $d_i$ and coefficient 0 of $d_j$. Therefore, no comparison between shifted versions is necessary. However, since texture is generally a regional phenomenon, the previous analysis should be extended to compute the edge variation estimates within a region of texture. Hence, the function $c_k(i)$ is introduced, measuring the correlation between the rows or columns of detail coefficients within the region of size k, as $$c_k(i) = \frac{1}{k} \sum_{j=i+1}^{i+k} c(i, j). \quad (5)$$

Figure 8:
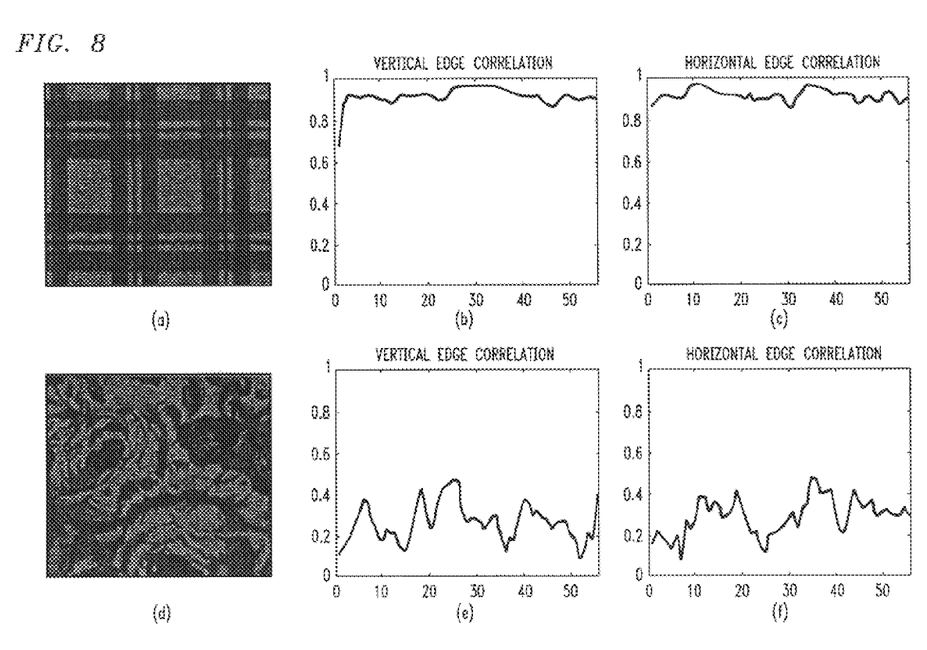
FIGS. 8(a)–8(c) and 8(d)–8(f) illustrate exemplary edge correlations for directional and nondirectional textures, respectively.

In experiments, $c_k$ was computed for regions of size $k=2^l$, with l=1, . . . , 5. For each symmetry axis, Equation (5) is applied to the three representative subbands, resulting in three sequences $c_k$. Estimates for directionality, $d_x$ and $d_y$, are obtained by integrating each sequence and summing the result, as $$d = \sum_{1,\ldots,3} \sum_i c_k(i), \quad (6)$$

where d stands for $d_x$ or $d_y$, depending on the analysis performed. Subbands $W_2^{1,0}, W_2^{22,0}, W_2^{3,0}$ are used to estimate the horizontal directionality $d_x$, while subbands $W_2^{0,1}$, $W_2^{0,2}, W_2^{3,0}$ are used to estimate the vertical directionality $d_y$. FIGS. 8(b) and 8(c) show vertical and horizontal examples, respectively, of the sequence $c_k$, for k=8, computed from the directional texture in FIG. 8(a). FIGS. 8(e) and 8(f) show vertical and horizontal examples, respectively, of the sequence $c_k$, for k=8, computed from the nondirectional texture in FIG. 8(c).

Regularity

Figure 9:
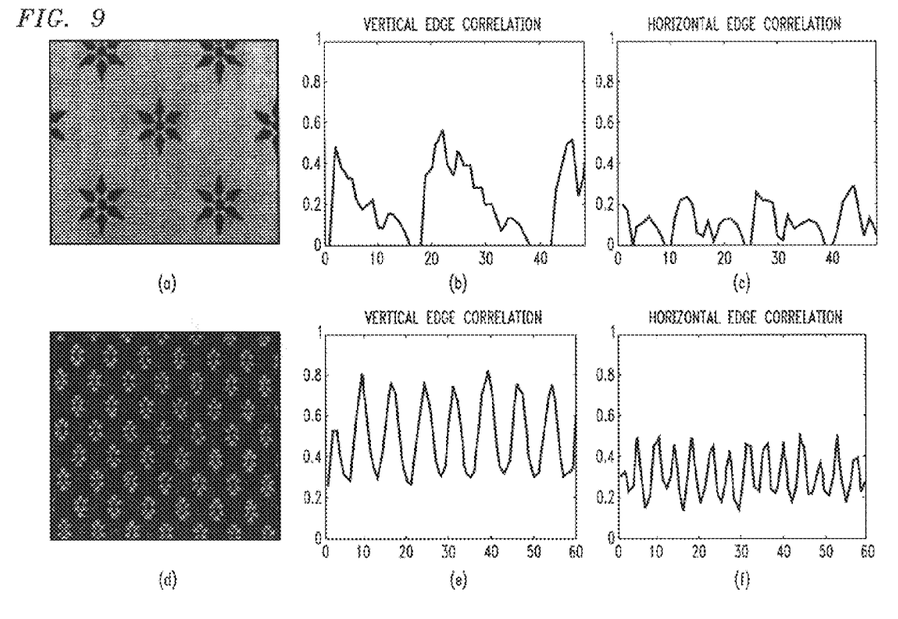
FIGS. 9(a)–9(c) and 9(d)–9(f) illustrate exemplary edge correlations for large regularity and small regularity textures, respectively.

For regular textures, the correlation sequence $c_k$ has dominant spectral component corresponding to the, frequency of the structural element's repetition (see FIG. 9).

Therefore, $c_k$ can be used to detect the regularity of a texture. Moreover, using a simple spectral analysis of the sequence, periodicity of a regular texture can be easily estimated.

To compute the regularity features, first extract the maximum component of the amplitude of the power spectrum $|\hat{c}_k|^2$ and compute the ratio, $e_k$, between the energy contained within the maximum component and the overall spectrum energy, as $$e_k = \frac{\max_N |\hat{c}_k|^2}{\sum |\hat{c}_k|^2}, \tag{7}$$

where N corresponds to the resolution used for the power spectrum estimation. Due to spectral leakage, the coefficients in the neighborhood of the maximum amplitude should be also included in the computation of $e_k$. The number of coefficients to be considered depends on N, since the coefficients usually leak as 1/N. This value is estimated for each region. size k (in the present example k=2, 4, 8, 16, 32). As estimates of regularity, the following features are computed $$r_m = \max_k e_k, \quad r_s = \operatorname*{argmax}_k e_k, \tag{8}$$

i.e., the parameter $r_m$ corresponds to the maximum value $e_k$ among all five values of k, the parameter $r_s$ denotes the region for which the maxima is obtained, and the parameter $r_f$ corresponds to the normalized frequency at which $r_m$ is obtained:

$$r_f = \frac{2}{N}\left(\operatorname*{argmax}_N |\hat{c}_k|^2 - 1\right). \tag{9}$$

These parameters are computed independently for the horizontal and vertical axes. FIGS. 9(b) and 9(c) show vertical and horizontal edge correlations, respectively, computed from the large regularity texture in FIG. 9(a). FIGS. 9(e) and 9(f) show vertical and horizontal edge, correlations, respectively, computed from the small regularity texture in FIG. 9(c).

Symmetry

In evaluating the symmetry of a texture sample, image symmetries are measured along the horizontal and vertical axes, i.e., the axes of replication. Hence, before the wavelet decomposition, the input texture is first preprocessed, in the manner previously described in conjunction with FIG. 7. More particularly, the texture is first split into four regions, and each region is flipped. In that way, all four regions have the same orientation and therefore can be used for the extraction of the symmetry features. Each region is then decomposed via the one-level wavelet transform. The quadratic spline basis, due to its compact support, provides good spatial localization. This is an important property, since the degree of the perceived symmetry highly depends on the spatial properties of an image.

To estimate the symmetry along the horizontal axis, the subbands of the upper left region are compared to the corresponding subbands of the bottom left region, and subbands of the upper right region are compared to the corresponding subbands of the bottom right region. In the same manner, to estimate the symmetry along the vertical axis, the subbands of the upper right region are compared to the corresponding subbands of the upper left region, and the subbands of the bottom left region are compared to the corresponding subbands of the bottom right region. As a distance measure between the wavelet coefficients from a region p and the wavelet coefficients in the corresponding subband of a region q, a squared $l_2$ norm is used, as $$\|D_{p,i}[n, m] - D_{q,i}[n,m]\|^2, \tag{10}$$

where $D_{p,i}[n,m]$ denotes a wavelet coefficient matrix from the region p, $D_{q,i}[n,m]$ represents a wavelet coefficient matrix from the region q, and i is the subband index i=0, ..., 3. However, experiments have shown that, up to a certain degree, human perception of symmetry is insensitive to shift of a pattern. For example, if the upper left and upper right regions exhibit the same pattern as the bottom left and bottom right regions, but the pattern is shifted for a fixed, small amount of pixels, the image is still perceived as symmetric along the horizontal axis. Therefore, instead of using Equation (10), one can compare shifted versions of the coefficient matrices. Hence, the minimum expected distance between the corresponding subbands of the regions p and q is defined as $$t_{p,q} = \min_{x,y} E(\|D_{p,i}[n,m] - D_{q,i}[n-d_n, m-d_m]\|^2), \tag{11}$$

where $d_n$ and $d_m$ denote all possible shifts of the wavelet coefficients matrix up to 10% of the image resolution. Then, the symmetry coefficients $s_x$ and $s_y$ are estimated by summing the minimum expected distances between the horizontal and vertical pairs.

Classification

Texture classification is performed by traversing the classification tree, as illustrated in FIG. 2. Each test is performed by comparing the corresponding features to the previously selected threshold values. For example, in the first step, directionality is tested by comparing features $d_x$ and $d_y$ to the thresholds as $$(d_x > \bar{d}_x) \wedge (d_y > \bar{d}_y) \tag{12}$$

If Equation(12) is satisfied, the analyzed texture is classified as directional. Otherwise, the classification process continues with Test 2, and so on. To estimate the thresholds for each test, a preselected set of textures are used. These sets are denoted as: D (directional textures), S (symmetric textures) and R (regular textures). Since small values of coefficients $s_x$, $s_y$, indicate high symmetry, while large values for $d_x$, $d_y$ indicate high directionality, the threshold values for the directionality and symmetry tests are determined as $$\bar{s}_x = \max_S s_x, \quad \bar{s}_y = \max_S s_y, \tag{13}$$

$$\bar{d}_x = \min_D d_x, \quad \bar{d}_y = \min_D d_y. \tag{14}$$

For determining the threshold values used in the tests of regularity (Test 3 and Test 4) it is important to observe that the sequence $c_k$ becomes periodic for regular textures. As illustrated in FIG. 9, the frequency is higher for textures having a small regularity than for textures with a large regularity. Experiments show that the most accurate estimate for the period is obtained for a value of k proportional to the size of the repeated pattern. Hence, for each region size k, a threshold pair $(\hat{r}_m^k, \hat{r}_f^k)$ is determined as $$r_m^k = \min_{R, r_s = k} r_m, \quad r_f^k = \min_{R, r_s = k} r_f. \quad (15)$$

To test regularity of the texture (with the regularity feature $r_s$), a threshold ($\hat{r}^{rs}, \hat{r}_f^{rs}$) is used in the following way:

$$(r_m > \hat{r}_x) \wedge (r_y > \hat{r}_y). \quad (16)$$

If Equation (16) is satisfied, the texture is found to be regular. In that case, the value of $r_f$ indicates the type of regularity, i.e., small, medium or large. As previously noted, an advantage of this classification process is that it can also be used to determine if a given texture is replicable.

Exemplary Algorithm

The above-described techniques may be implemented in a wide variety of different texture processing algorithms. In an example of one such algorithm, the classification tree of FIG. 2 is used to precluster the textures in a database of textures into the following four groups: directional, symmetric, regular and nonregular. After the database of textures is preclustered, similar textures can be retrieved in the following manner. For an arbitrary input image texture T, the complete feature vector $f_T$ is computed. Using the tree traversal the input texture is classified into one of the four groups. In the next step, for each texture i in the corresponding group, the distance from the input texture is computed, dist(i,T). The distance is computed using the squared $l^2$ norm between the feature vectors $f_T$ and f(i).

The replicability determination techniques described above can then be used to determine if a given retrieved texture meeting specified similarity criteria is in fact replicable. If replicable, the given texture can be replicated as required for a given application. If it is not replicable, another similar texture can be retrieved, or alternatively, known techniques for correcting for non-replicability can be applied. The invention can of course be utilized in numerous other texture processing applications, such as, e.g., texture analysis, segmentation and retrieval.

Exemplary Processing Systems

Figure 10:
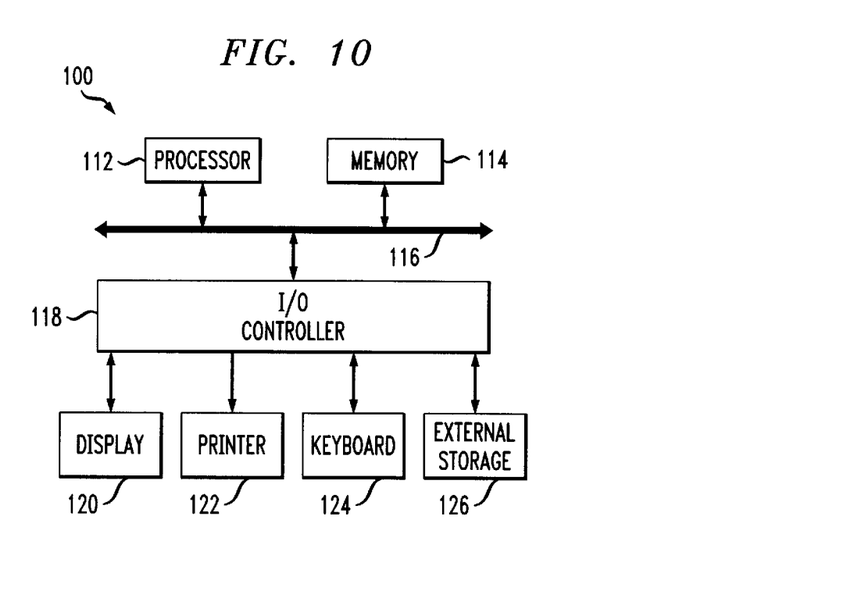
FIGS. 10 and 11 show exemplary processing systems in which the invention may be implemented.

FIG. 10 shows an exemplary processing system 100 in which texture processing techniques in accordance with the present invention may be implemented. The processing system 100 includes a processor 112 and a memory 114 which are connected to communicate via a bus 116. The system 100 further includes an input/output (I/O) controller 118 which is connected to the bus 116 in order to communicate with the processor 112 and memory 114. The I/O controller 118 in conjunction with the processor 112 directs the operation of a number of peripheral components including a display 120, a printer 122 a keyboard 124 and an external storage device 126.

One or more of the elements of system 100 may represent portions of a desktop or portable personal computer, a workstation, a microcomputer, a mainframe computer, or other type of digital processor. The memory 114 and external storage device 126 may be electronic, magnetic or optical storage devices. The external storage device 126 may include a database of texture information, e.g., a database of image texture samples or patterns. The external storage device 126 may be a single device, or may be distributed, e.g., distributed across multiple computers or similar devices. The term "database" as used herein is intended to include any arrangement of stored data.

The present invention may be implemented at least in part in the form of a computer software program stored in memory 114 and/or external storage device 126. The program is executed by processor 112 in accordance with user-supplied input data to produce a desired output in a predetermined format, e.g., on display 120 or on a print-out generated by printer 122. The user-supplied input data may be entered at the keyboard 124, read from one or more files of external storage device 126, or obtained over a network connection as will be described in conjunction with FIG. 11 below.

Figure 11:
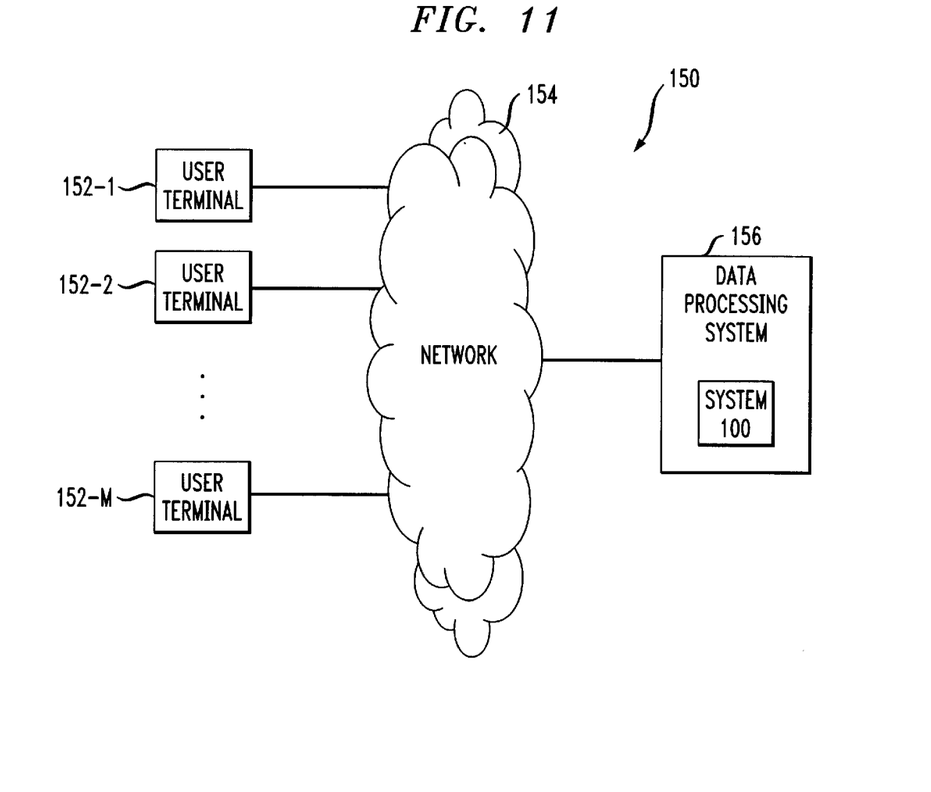

FIG. 11 illustrates an exemplary network-based system 150 in which the invention may be implemented. The system 150 includes a set of user terminals 152-i, i=1, 2, . . . M coupled to a network 154. A centralized data processing system 156 is also coupled to the network 154, and includes the system 100 of FIG. 10 as well as additional supporting processing hardware and software. One or more of the user terminals 152-i may be, e.g., desktop, portable or palmtop computers, workstations, mainframe or microcomputers, television set-top boxes, or any other suitable type of digital data processor, as well as portions or combinations of such processors. For example, one or more of the user terminals 152-i may be a processing system configured as shown in FIG. 10. The network 154 may be, e.g., the Internet, a local area network, a wide area network, an intranet, a telephone, cable or satellite network, as well as combinations or portions of these and other networks.

In operation,,one or more of the user terminals 152-i access the centralized data processing system 156 via the network 154 to obtain texture-related information. For example, the centralized data processing system 156 may include a server or set of servers which communicate with the user terminals 152-i via conventional Transmission Control Protocol (TCP)/Internet Protocol (IP) connections. As part of this communication, the system 156 may deliver information to one or more of the user terminals 152-i, e.g. as part of a web page configured in Hypertext Mark-Up Language (HTML) or other suitable file format and delivered over network 154 in accordance with, e.g., the Hypertext Transport Protocol (HTTP). The data processing system 156 may be co-located with one or more of the user terminals 152-i, or geographically remote from all of the user terminals 152-i, depending on the specific implementation of the system 150.

A particular user at one of the user terminals 152-i may initiate the communication process by, e.g., entering a Uniform Resource. Locator (URL) or similar information identifying a web page, associated with the system 156, in a web browser or other application program running on that user terminal. The user can then interact with the system 156 to process texture-related information in the manner described previously. Various types of graphical displays of the processed user information may then be delivered to back to the user terminal over the network 154. Such graphical displays may be generated in accordance with software program instructions executed by processor 112 of system 100.

In a texture pattern matching application of the system 150, a user at one of the user terminals 152-i enters a query regarding a texture pattern for which the user desires to find matching information in a database accessible by one or more of the servers associated with the data processing system 156. The user utilizes a web browser or other suitable program running in terminal 152-i to log on to a web page associated with a source of pattern information and accessible over the network 154. The web page may be supported by one or more of the servers of the data processing system 156. The user selects from the web page a database or set of databases which the user would like to search. If the user does not specify a particular database, all of the databases associated with the web page may be searched.

The user then supplies a query image on which the search will be based. The query image may be an image selected from a catalog accessible through the web page, a scanned image supplied by the user, e.g., in the form of a sketch or Other previously scanned or downloaded image. The user then defines a query, i.e., specifies the other parameters of the search, such as the type of matching patterns that are of interest, the number of matches desired, etc. The user then launches the search by, e.g., clicking an appropriate button or icon on the web page, such that the query and query image are supplied over the network 154 to an appropriate one of the servers of the system 156. The system responds by displaying to the user a specified number of the best matches. The user can continue the process by modifying the search, launching another search, e.g., with a new query image or set of query parameters, or can exit the system.

It should be noted that the particular implementation of the systems 100 and 150 will vary depending on the specific application. For example, in certain applications, such as interior design stores or other facilities, to have the user terminals geographically co-located with one or more of servers. In an Internet-based application, the user terminals may represent personal computers at the user's homes or offices, and the servers may represent, e.g., a server cluster at a remote location designed to process a large number of user queries received from, around the world. Many other applications are of course possible.

The above-described embodiments of the invention are intended to be illustrative only. For example, the wavelet decomposition filter bank used in the illustrative embodiments may be replaced with other types of filter banks. These and numerous other alternative embodiments may be devised by those skilled in the art without departing from the scope of the following claims.

What is claimed is:

1. A processor-implemented method of analyzing an information signal having a texture, the method comprising the steps of:

extracting texture-related features from the information signal; and generating an output signal representative of at least one of a directionality, a symmetry and a, regularity of the texture, based on the extracted features, wherein the step of extracting texture-related features further includes the step of computing a feature vector as $$f_I = [d_x\ d_y\ s_x\ s_y\ r_{x,m}\ r_{x,s}\ r_{x,f}\ r_{y,m}\ r_{y,s}\ r_{y,f}],$$

where $d_x$ and $d_y$ represent measures of horizontal and vertical directionality, $r_{x,m}$, $r_{x,s}$ and $r_{x,f}$ are regularity features along a horizontal axis, $r_{y,m}$, $r_{y,s}$ and $r_{y,f}$ are regularity features along a vertical axis, and $s_x$ and $s_y$ are measures of symmetry along the horizontal and vertical axes.

2. The method of claim 1 further comprising the step of:
   determining replicability of the texture utilizing one or more of the directionality, the symmetry, the regularity and regularity type of the texture.

3. The method of claim 1 wherein the information signal comprises at least a portion of at least one image.

4. The method of claim 3 further including the step of separating the image into a plurality of regions, rotating at least a subset of the regions such that each region has a common orientation, and applying a wavelet decomposition to each of the regions.

5. The method of claim 1 wherein the step of extracting texture-related features further includes implementing a wavelet decomposition of the information signal.

6. The method of claim 5 wherein the step of extracting texture-related features further includes the steps of:

extracting vertical edges of the information signal utilizing a first subband of the wavelet decomposition; and extracting horizontal edges of the information signal utilizing a second subband of the wavelet decomposition.

7. The method of claim 6 wherein the step of extracting texture-related features further includes the step of extracting coarse features of the information signal utilizing a third subband of the wavelet decomposition.

8. The method of claim 6 wherein the step of extracting texture-related features further includes the step of extracting corner edges of the information signal utilizing a fourth subband of the wavelet decomposition.

9. The method of claim 1 wherein the step of determining replicability of the texture further includes the steps of:

determining the directionality of the texture; and identifying the texture as replicable if the texture has a designated directionality.

10. A processor-implemented method of analyzing an information signal having a texture, the method comprising the steps of:

extracting texture-related features from-the information signal;

generating an output signal representative of at least one of a directionality, a symmetry and a regularity of the texture, based on the extracted features; and determining replicability of the texture utilizing one or more of the directionality, the symmetry, the regularity and a regularity type of the texture wherein the step of determining replicability of the texture further includes the steps of:

determining the directionality of the texture; and identifying the texture as replicable if the texture has a designated directionality, wherein if the texture is not identified as replicable based on the directionality, the step of determining replicability of the texture further includes the steps of:

determining the symmetry of the texture; and identifying the texture as non-replicable if the texture does not have a designated symmetry.

11. The method of claim 10 wherein if the texture is not identified as replicable based on the directionality or as non-replicable based on the symmetry, the step of determining replicability of the texture further includes the steps of:

determining the regularity of the texture; and identifying the texture as non-replicable if the texture does not have a designated regularity.

12. The method of claim 11 wherein if the texture has a designated regularity, the step of determining replicability of the texture further includes the steps of:

determining a type of the regularity of the texture;

identifying the texture as replicable if the regularity type is small; and identifying the texture as non-replicable if the regularity type is medium or large.

13. An apparatus for processing an information signal having a texture, the apparatus comprising:

a filter bank for extracting texture-related features from the information signal, wherein the extracted features are used to determine at least one of a directionality, a symmetry and a regularity of the texture, and to determine replicability of the texture utilizing one or more of the directional, the symmetry, the regularity and a regularity type of the texture, wherein a feature vector is computed as $$f_T=[d_x\ d_y\ s_x\ s_y\ r_{x,m}\ r_{x,s}\ r_{x,f}\ r_{y,m}\ r_{y,s}\ r_{y,f}],$$

where $d_x$ and $d_y$ represent measures of horizontal and vertical directionality, $r_{x,m}$, $r_{x,s}$ and $r_{x,f}$ are regularity features along a horizontal axis, $r_{y,m}$, $r_{y,s}$ and $r_{y,f}$ are regularity features along a vertical axis, and $s_x$ and $s_y$ are measures of symmetry along the horizontal and vertical axes.

14. The apparatus of claim 13 wherein the information signal comprises at least a portion of at least one image.

15. The apparatus of claim 13 wherein the filter bank implements a wavelet decomposition of the information signal.

16. The apparatus of claim 16 wherein the filter bank further includes:

a first filter for extracting vertical edges of the information signal utilizing a first subband of the wavelet decomposition; and a second filter for extracting horizontal edges of the information signal utilizing a second subband of the wavelet decomposition.

17. The apparatus of claim 15 wherein filter bank further includes a third filter for extracting coarse features of the information signal utilizing a third subband of the wavelet decomposition.

18. The apparatus of claim 15 wherein the filter bank further includes a fourth filter for extracting corner edges of the information signal utilizing a fourth subband of the wavelet decomposition.

19. An apparatus for processing an information signal having a texture, the apparatus comprising:

a memory for storing at least a portion of the information signal; and a processor coupled to the memory and operative to implement a filter bank for extracting texture-related features from the information signal and to determine at least one of a directionality, a symmetry and a regularity of the texture based on the extracted features, wherein the processor is further operative to extract the texture-related features by computing a feature vector of the form $$f_T=[d_x\ d_y\ s_x\ s_y\ r_{x,m}\ r_{x,s}\ r_{x,f}\ r_{y,m}\ r_{y,s}\ r_{y,f}],$$

where $d_x$ and $d_y$ represent measures of horizontal and vertical directionality, $r_{x,m}$, $r_{x,s}$ and $r_{x,f}$ are regularity features along a horizontal axis, $r_{y,m}$, $r_{y,s}$ and $r_{y,f}$ are regularity features along a vertical axis, and $s_x$ and $s_y$ are measures of symmetry along the horizontal and vertical axes.

20. The apparatus of claim 19 wherein the filter bank implements a wavelet decomposition of the information signal.

21. The apparatus of claim 19 wherein the processor is operative to determine replicability of the texture utilizing one or more of the directionality, the symmetry, the regularity and a regularity type of the texture.

22. A machine-readable medium storing one or more software programs for processing an information signal having a texture, wherein the one or more software programs when executed by a processor include:

a step for extracting texture-related features from the information signal;

a step for generating an output signal representative of at least one of a directionality, a symmetry and a regularity of the texture, based on the extracted features; and a step for determining replicability of the texture utilizing one or more of the directionality, the symmetry, the regularity and a regularity type of the texture, wherein the step of extracting texture-related features further includes the step of computing a feature vector as $$f_T=[d_x\ d_y\ s_x\ s_y\ r_{x,m}\ r_{x,s}\ r_{x,f}\ r_{y,m}\ r_{y,s}\ r_{y,f}],$$

where $d_x$ and $d_y$ represent measures of horizontal and vertical directionality, $r_{x,m}$, $r_{x,s}$ and $r_{x,f}$ are regularity features along a horizontal axis, $r_{y,m}$, $r_{y,s}$ and $r_{y,f}$ are regularity features along a vertical axis, and $s_x$ and $s_y$ are measures of symmetry along the horizontal and vertical axes.

* * * * *